(12) United States Patent
Peterson et al.

(10) Patent No.: US 10,227,118 B2
(45) Date of Patent: Mar. 12, 2019

(54) MODULAR FLOTATION SYSTEM

(71) Applicant: Continental Shelf Associates, Inc., Stuart, FL (US)

(72) Inventors: Kevin Peterson, Stuart, FL (US); David Dupont, North Palm Beach, FL (US); Donald Darling, Palm Beach Gardens, FL (US)

(73) Assignee: Continental Shelf Associates, Inc., Stuart, FL (US)

( * ) Notice: Subject to any disclaimer, the term of this patent is extended or adjusted under 35 U.S.C. 154(b) by 0 days.

(21) Appl. No.: 15/657,931

(22) Filed: Jul. 24, 2017

(65) Prior Publication Data

US 2018/0029678 A1 Feb. 1, 2018

Related U.S. Application Data

(60) Provisional application No. 62/368,636, filed on Jul. 29, 2016.

(51) Int. Cl.
| | | |
|---|---|---|
| *B63B 22/00* | (2006.01) | |
| *B63G 8/24* | (2006.01) | |
| *F16L 1/24* | (2006.01) | |
| *E21B 17/01* | (2006.01) | |
| *B63B 9/06* | (2006.01) | |

(52) U.S. Cl.
CPC .................. *B63G 8/24* (2013.01); *F16L 1/24* (2013.01); *B63B 2009/067* (2013.01); *B63B 2207/02* (2013.01); *B63B 2231/50* (2013.01); *E21B 17/012* (2013.01)

(58) Field of Classification Search
CPC ... B63B 2207/02; B63B 2231/50; B63G 8/24; F16L 1/24; E21B 17/012
See application file for complete search history.

(56) References Cited

U.S. PATENT DOCUMENTS

| | | | | |
|---|---|---|---|---|
| 4,705,331 A | * | 11/1987 | Britton | E02B 17/0026 24/463 |
| 8,506,339 B2 | * | 8/2013 | Fletcher | A01M 31/06 43/3 |
| 2013/0280973 A1 | | 10/2013 | Elder et al. | |

OTHER PUBLICATIONS

"Modular Buoyancy", Trelleborg Offshore Products, Accessed via the Internet at <<http://www.trelleborg.com/en/offshore/products/subsea—buoyancy/modular—buoyancy#>> Trelleborg 2017, 6 pages.
"Standardized Buoyancy Modules", Trelleborg Offshore, Accessed via the Internet at <<http://www.trelleborg.com/offshore>> undated, 2 pages.

* cited by examiner

*Primary Examiner* — Andrew Polay
(74) *Attorney, Agent, or Firm* — Duane Morris LLP

(57) ABSTRACT

A buoyant apparatus and method of use buoyancy to offset the weight of a load during immersion of the load in a fluid medium such as a payload manipulated by a cable and crane or by a remotely operated undersea vehicle. Buoyancy modules that can be of different size and shape have elongated supports that are attachable via complementary connection fixtures at the ends. The attached supports form a skeleton of the array. The connection fixtures are axially resiliently compressible and maintain the buoyancy modules in abutment notwithstanding shrinkage or expansion of the buoyant material due to hydrostatic pressure that increases with depth.

14 Claims, 8 Drawing Sheets

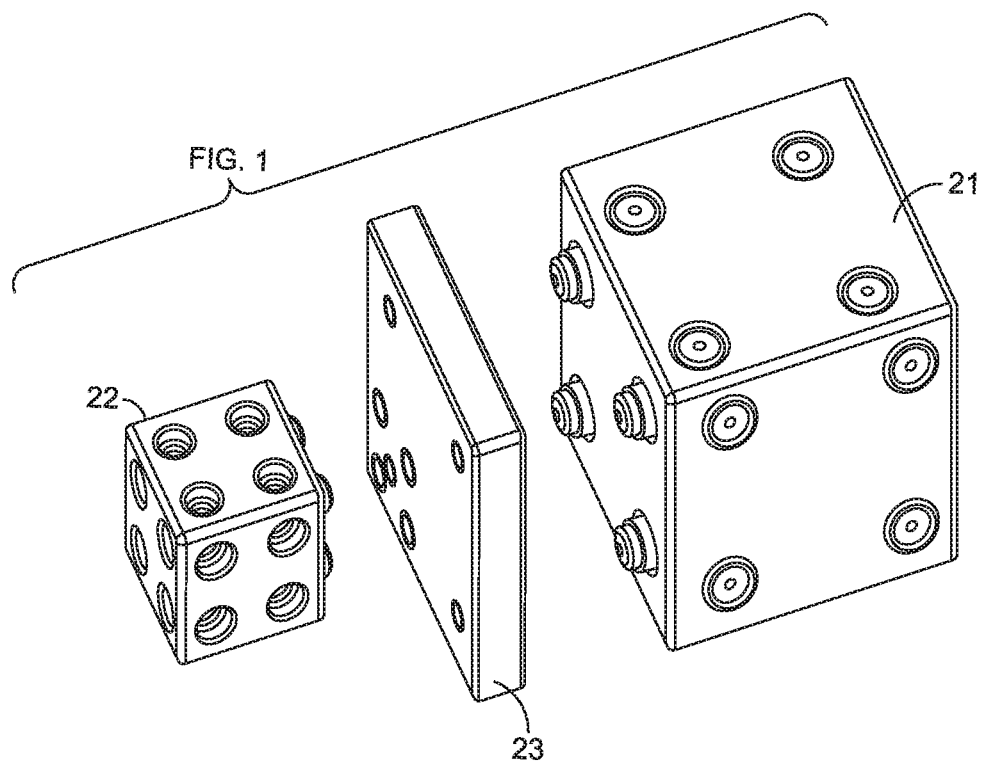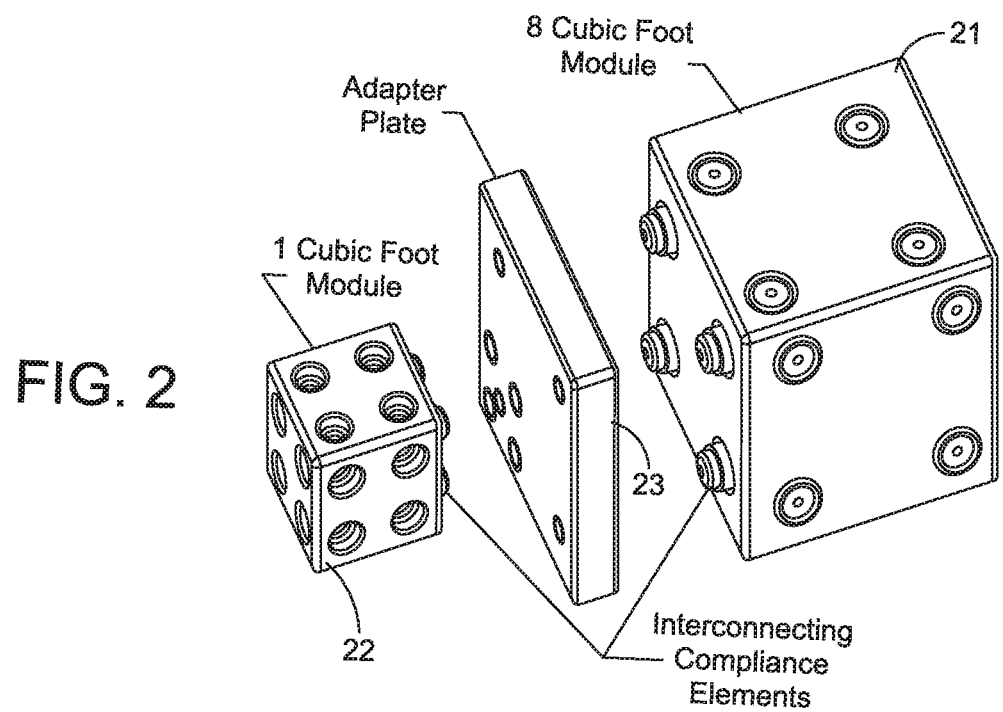

MODULAR FLOTATION SYSTEM

CROSS REFERENCE TO RELATED APPLICATION

This application claims the priority of U.S. Provisional Application No. 62/368,636, filed Jul. 29, 2016.

BACKGROUND

A modular re-usable buoyancy and flotation apparatus having conveniently connected buoyancy elements to form buoyant arrays of desired sizes, shapes and depth/pressure ratings is adapted for varied jobs in marine construction, scientific research and other subsea applications. The apparatus includes a skeleton of linear supports traversing buoyant shapes, the supports terminating in inter-element connection fixtures that extend and retract resiliently and can compensate for compression of the buoyant medium at the hydrostatic pressures of different undersea depths.

It is known to attach one or more buoyant elements to weight (a "load") that is to be manipulated below a water surface, e.g., in the sea. Up-thrust from the buoyant element supports some of the weight of the load. The attached load and buoyant element are a movable structural unit, with at least a reduced need to support the weight of the load by other means. Conversely, a load might be buoyant, in which case one might choose to attach one or more weights to offset the up-thrust of the buoyant load.

The present disclosure seeks to provide a practical way to enable buoyant elements to be attached to weighted loads to accommodate loads in various configurations. The configurations can involve loads with distributed higher and lower density, i.e., concentrated weights and buoyant volumes at different places, causing structural stresses. These are handled by structurally attaching versatile modular buoyant elements in arrays. Provisions are made to enable deployment of over a considerable range of depth and pressure, namely by grading the buoyant elements in depth ranges using syntactic flotation materials, to bear compression forces. Inasmuch as the buoyant elements are modular, they are aptly recoverable for re-use, and can be reconfigured in wholly new combinations, capacities, shapes and arrays.

Each modular flotation elements provides an incremental amount of buoyancy. A combined and preferably positively-attached set of low cost buoyancy arrangements offset at least part of the weight of subsea deployed units, instruments, equipment and vehicles of various sizes, configurations and weight-versus-buoyancy distribution.

Some or all of the flotation elements (or groupings of elements) employ syntactic flotation materials containing water-pressure resistant bodies. Sealed hollow beads or similar shapes that are small, and individually structured to withstand expected pressure without substantial compression, can be distributed evenly in a carrier medium. The forces associated with buoyancy are such that that the up-thrust provided by a buoyant element is equal to the weight of the column of water that the element displaces. The volume of a body of buoyant material often decreases with increased water pressure. Use of syntactic flotation materials tends to reduce the compression, but it is necessary to configure the syntactic flotation material to withstand expected pressures.

The flotation modules can be designed as regular polyhedral shapes such as cubes of various sizes, preferably for selected depth ratings. These shapes are arranged to abut, stack and nest with one another. In certain examples the flotation modules are equally sized and abut or stack as blocks. Alternatively, larger and smaller elements can be combined, e.g., to fill out volumes that are partly occupied, such as by parts of the load or its carrier.

The modules can integrally include or structurally receive and engage with restraint and structural mounting components by which the modules forming the components of an array are fixed relative to one another and attached to supported loads. The forces associated with dynamic motion during launch and or recovery through the air/water interface, as well as buoyancy in water, are accommodated in exemplary embodiments through a system of interlocking restraint members that engage in self-supporting manner with integral strength members incorporated in the modules or used to couple the interlocking restraint members. The modular system is scalable, accommodating small installations, for example with 2 to 10 modules or block assemblies of plural modules, up to large installations of connected flotation block assemblies or concurrently-deployed independent flotation block assemblies that are tethered to a load and optionally to one another by the available interconnect and mounting hardware. Moreover, the structures employed for interlocking assembly conveniently permit an assembly of the flotation blocks and assemblies to be configured in regular or irregular shapes, advantageously to complement the weight distribution of the supported load.

In the marine construction and scientific industries, manned or unmanned vehicles (craft), remotely operated or autonomous vehicles and the like, are useful to guide or carry various functional and structural items to locations between the surface and the seafloor at various depths. The items as well as the craft can be regarded as payload items to be delivered and recovered. The payload items may be functional units, structural parts to be assembled and temporarily or permanently installed. The payload items may include intervention tools or instruments. Any of various possible payloads can perform a myriad of tasks at any point from the ocean surface to the seafloor. A challenge for operators of vehicles and divers or on-board vehicle crew is to maintain a manageable near neutral buoyancy when attempting to move a payload in seawater, so that the vehicle can control the depth and position of the payload during transport and also during manipulation at the subsea work site, without the need for the vehicle to exert a great deal of thrust. Advantageously, the present disclosure assists in this process while avoiding or minimizing the need for complications such as ballast tanks or other means to alter buoyancy by enabling the vehicle to assume or shed weight.

A subsea transport unit or vehicle can be used like a farm tractor deploying a farm implement. The subsea transport unit or vehicle provides motive force, vertical and horizontal thrust, local control and electric, hydraulic or other power take-offs to operate a subsea tool package. A basic subsea vehicle is advantageously designed with a moderate amount of reserve buoyancy to offset the expected weight of a self-mounted payload of tools and/or instruments or controllable ballast arrangement to assist in lifting the payload during recovery. Often the wet weight of the tools and instruments that are sought to be deployed is higher than the base vehicle's reserve buoyancy, plus vertical thrust. In that case, some or all of the wet weight of a payload can be offset by adding supplemental buoyancy, preferably by accommodating reconfigurable re-usable flotation modules as disclosed herein.

Deployment and installation of subsea structures, equipment or tools to a seafloor oilfield production spread is an exemplary application of this technology, wherein the flotation modules can be adapted to the particular use, thus enabling precise positioning and alignment of the payload by reducing the need to counteract weight or up-thrust, as encountered.

Steel structures and equipment in such applications can be heavy in water compared to a transport vehicle, and sometimes expensive heavy lift cranes are deployed to lower and position heavy payloads from the surface. However, preferably internally mounted flotation arrangements designed to be incorporated into equipment tethered or included as part of a subsea vehicle, reduce the in-water weight of the payload and/or subsea vehicle so that the vehicle can readily align and position the payload using modest thrusters. Permanent installation of flotation on the equipment is not always desirable or cost effective. The equipment might be intended to be mounted and to remain subsea, in which case the flotation arrangements are superfluous. If the tool package is to be used or to be variably configured from mission to mission, the flotation arrangements for one mission may not be apt for another mission.

SUMMARY OF THE DISCLOSURE

It is an aspect of the present disclosure to facilitate temporary installation of modular flotation arrangements that are useful for deployment and positioning of equipment on the seafloor, especially using Remotely Operated Vehicles (ROVs). Among other objects, the modular flotation arrangements are configurable to supply different amounts of buoyancy for successive missions characterized by different payload size and weight conditions. The modular flotation arrangements also are adaptable to accommodate missions that traverse different and possibly substantial depths.

The mounting arrangements advantageously are arranged so that standard Remotely Operated Vehicle manipulator tools can be used to remove, untether or detach some or all of the temporary flotation modules after use, especially to enable recovery for re-use. Exemplary interfacing elements including release pins and shackles can be provided as disclosed herein, and are advantageous to enable ready engagement and disengagement of the modular flotation assemblies, at least with one another, and also to payloads and ROVs. Once disconnected from a payload, the modular flotation assembly can be returned to the surface and its elements reused in a mission with similar or quite different flotation needs.

BRIEF DESCRIPTION OF THE DRAWINGS

There are shown in the respective drawing figures various arrangements that are intended to demonstrate advantageous applications of the invention. It should be appreciated that the invention is subject to embodiment in various ways and is not limited to the depicted examples. In the drawings, FIG. 1 is a perspective illustration of two differently sized buoyancy elements connectable to one another via an adapter element, shown detached.

FIG. 2 is a perspective illustration corresponding to FIG. 1, which elements labeled.

DETAILED DESCRIPTION OF EXEMPLARY EMBODIMENTS

Figure 3:
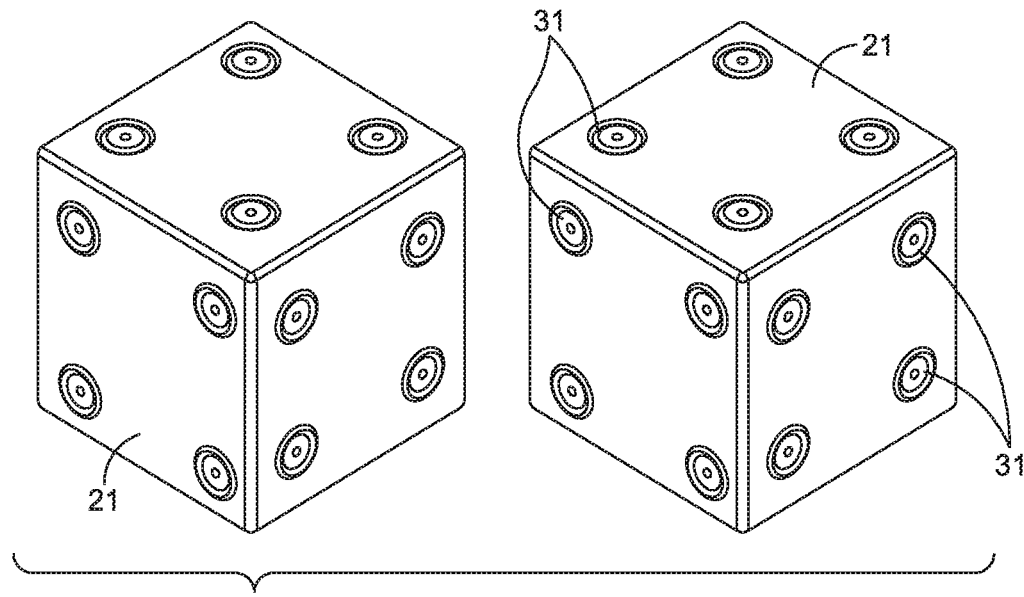
FIG. 3 is a perspective view of two buoyancy modules of equal size, the left module showing in phantom the elongated structural supports traversing a block of buoyancy material and ending at connection fixtures disposed in counter bores at the surface for attaching the modules in arrays.

The invention comprises one or more arrays of two or more interlocking standardized flotation modules 21. The modules can be of equal size, or as shown in FIG. 1, modules 21, 22 of different sizes can be configured to be attachable and detachable directly or indirectly through interface elements 23 to form arrays. For making the structural attachments between modules and to structures that are external to the array such as loads or submersible vehicles, related fixtures and hardware including structural members and components are provided for detachable connection and positioning as described in detail herein. These parts enable a user to create any number of configurations of plural preferably-standardized flotation module arrays, by selecting among modules and attaching the selected modules to one another in a building block manner to form arrays of plural connected modules.

The arrays of plural modules can be elongated by abutting and attaching modules in one, two or three dimensions, either continuously or so as to provide with gaps between modules or subassemblies and to interperse and accommodate other structures, such as structural parts of a manipulating vehicle or elements of payload. Selective placement of the modules and gaps provides the assembler with the ability to control the buoyancy of subcombinations such as the manipulating vehicle plus a payload, or plural payload elements. Selective placement also enables the assembler to position the center of mass of the subcombinations and the center of buoyancy with respect to subcombinations that among other uses are expected at times to float at the surface.

An object is to enable the user to construct a customized arrays, sized and shaped from interconnected flotation modules abutted in a one, two or three dimensional array and affixed to one another by structural members. The arrays provide buoyancy or supplemental buoyancy to a wide variety of subsea modules, tools, instrumentation packages, vehicles and submersibles. Advantageously, connection structures facilitate structural attachments at attachment points 31 (see, e.g., FIG. 3) useful to exert or bear force directed in any of such three dimensions or directions. At such attachment points 31, flotation modules 21 or their connected and/or supporting structures are affixed to each other in an array and to subsea equipment, while maintaining structural integrity of the array. The structural strength of individual flotation modules, blocks of abutting or relatively affixed flotation modules, and also the payload or manipulation vehicle all contribute to the structural strength of the array. In the embodiments disclosed as examples, linear connection members 33 (e.g., as seen in FIG. 4) traverse the array, for example extending through the bodies of the flotation modules to connection fixtures on the surfaces or faces of the modules, and are attachable to complementary connection fixtures on other flotation modules, especially immediately adjacent abutting modules, to form structurally robust arrays that have numerous points at which further connections can be made.

Supplemental buoyancy for subsea systems and packages can be expensive, particularly when highly customized to a specific use, or perhaps employed in a manner that is rarely called for. Often, the optimal flotation package that might be deployed is different from mission to mission. A highly customized pre-designed flotation configuration for every possible mission might be conceivable but is neither practical nor cost effective.

The present modular flotation system aims at a general purpose arrangement of modules 21 that is versatile in that customization involves selecting flotation modules from among a set of modules of size and flotation material that is apt for the particular mission and attaching them to one another and to loads and/or submersibles to make up the required shape and buoyancy distribution. A set of flotation blocks comprises two or more sets of blocks that each use different syntactic flotation materials. The blocks are interchangeably sized, but their flotation materials and are configured for different depth ratings.

The depth rating of a flotation module is determined by the nature and sizing of the buoyant elements distributed through the material of the module, such as the internal diameter, wall thickness and density of glass spheres incorporated into the material as an aggregate in a durable filler of settable polymer. The depth rating is made with the understanding that less durable flotation spheres or other bodies may be useful for flotation up to a given depth without damage or undue deformation, but will collapse at a greater depth. Collapse of distributed flotation elements in a filler leads to compression of the flotation modules and may detract from the functional effectiveness of the supplemental buoyancy array of modules.

Plural modules 21, 22 are preferably provided in graduated external sizes, such as from 1 to about 30 cubic feet (one to three feet on a side for cubes). Modules of different sizes can be attached to one another by disposing interface elements between them, wherein opposite faces of the interface elements have fixtures such as rod end fasteners 35 (see FIG. 4) complementary to one another on larger and smaller sized modules, respectively located on opposite sides of interfacing elements. Integral interconnects and mounting hardware including lifting/attachment appliances 39 affix the modules to one another, to any included interfacing elements, and interconnects that appear at the surfaces provide points of attachment for subsea equipment such as ROVs, payload packages, tethers and hooks and the like. The interconnects and hardware provide temporary or permanent anchoring points at which various end terminations can attach and release subsea portable units, equipment, tool packages and lines, whether by automatic operation or including the use of tools.

Arrays of the reusable modules can be easily reconfigured and reused in a most flexible fashion on the next mission, simply by re-attaching modules to one another in a different geometry appropriate to the next mission, and by using a different combination and placement of interconnects and hardware.

According to one aspect, a provision to compensate for the effects of buoyant material compression due to hydrostatic pressure at depth (e.g., compression of a syntactic foam) is designed into the interconnect hardware. Elongated structural support elements are provided for the bodies of the flotation modules and provide points of attachment at terminal ends of the support elements occurring at surfaces of the flotation module arrays, for interconnect coupling assemblies.

In an advantageous example, elongated structural support elements comprise bars 42 (see, e.g., FIG. 4) with threaded ends affixed to end elements 35 that are axially compressible to an extent that complements shrinkage and expansion of the flotation modules due to water pressure differences over their useful depth range, from the surface down to an operational depth. In exemplary embodiments, plural such bars 42 are affixed end-to-end with interspersed axially compressible end elements, termed compliance fittings. The connected bars 42 can traverse all or part of the flotation module array and be terminated at the outer array surfaces by a washer and nut or access point fixture 39, for attaching a cable or other element, or terminated at other functionally relevant points between abutting modules in the array.

The bars 42 in the embodiments shown extend through the flotation modules 21 in orthogonal directions, preferably four bars through each side in an array of flotation modules shaped as cubes (FIG. 4). The bars 42 form a substantially lattice or skeleton that maintains the relative positions of the flotation modules. However it is an aspect of the array that the connections between rods 42 are axially compressible and extendable against spring bias included in the rod-to-rod connections. This supports the array while permitting the individual flotation modules 21 to shrink and expand with pressure variations and the connected bars 42 likewise to retract and expand, such as to maintain the abutment of adjacent modules 21 and likewise to maintain the integrity of the array.

Figure 5A:
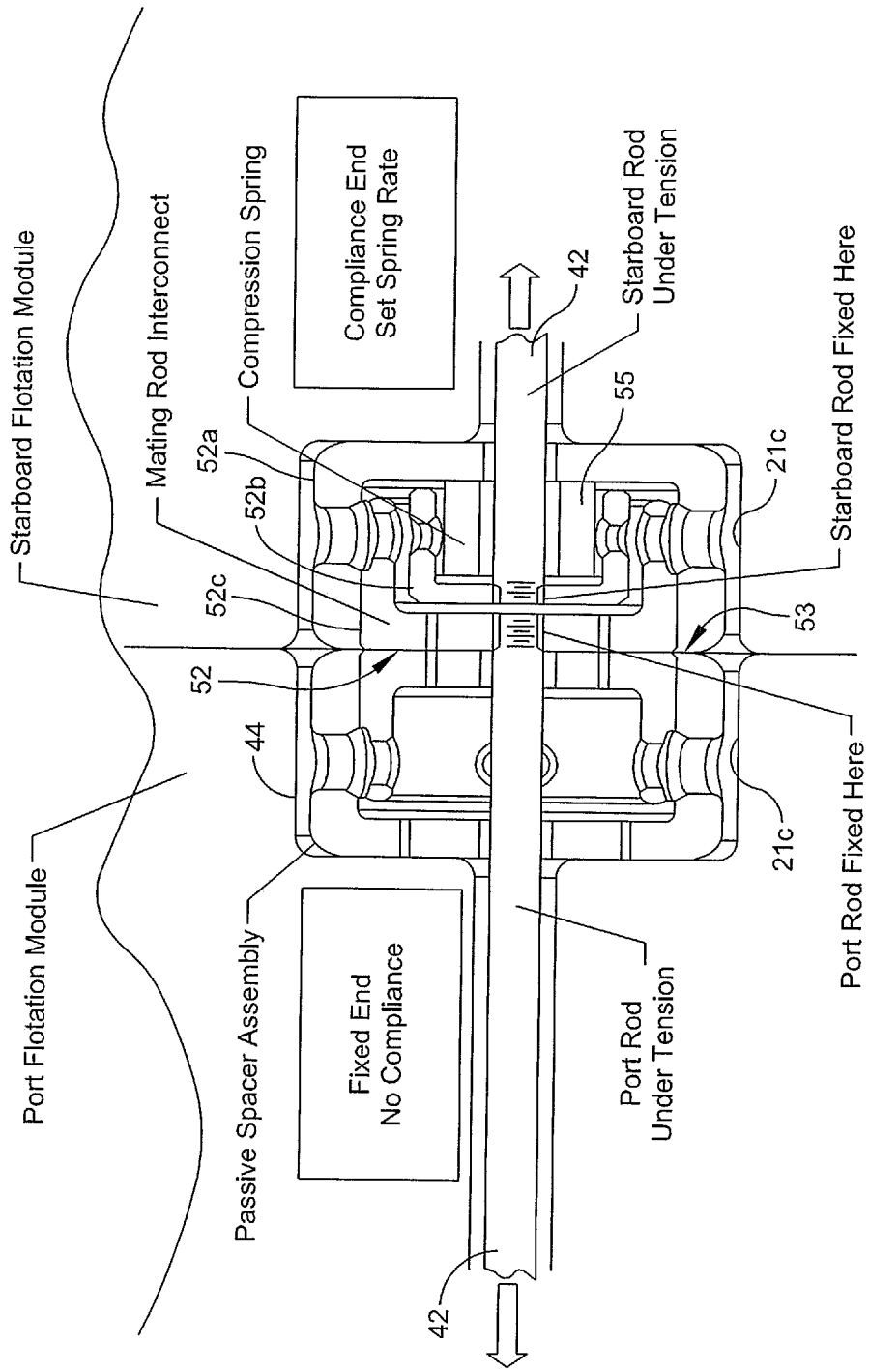
FIG. 5a is a detailed section view showing the mating of the compliance assemblies and spacers of two modules attached by the structures terminating their elongated support elements.
Figure 5B:
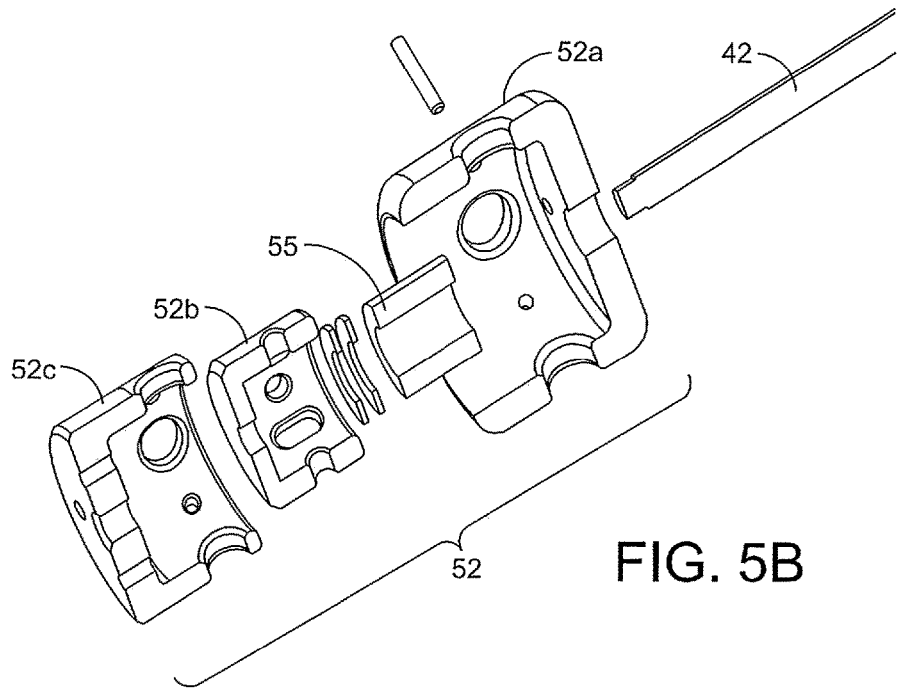
FIG. 5b is an exploded sectional perspective view of a compliance element according to one embodiment.

Optionally, the spring pressure loaded into the rod-to-rod connections can be adjustable. However more preferably and as seen in FIGS. 5*a*, 5*b*, no precise torque settings are required to adjust the spring pressure. The spring pressure is determined by the axial dimension of an axially compressible spring element 55 captured under pressure between movable faces within the compliance end fittings 52 (also referred to herein as a compliance element or compressible element). The assembler tightens the compliance end fittings 52, which function as the interconnect coupling assemblies at the junctions between adjacent co-linear bars 42, down to a built-in travel stop 52*c* at which telescoping elements 52*b*, bear against an axial spring 55 at a compression determined by the dimensions of the axial spring element 55 and the axial space fixed for the spring element 55 by the travel stop 52*c*. The compliance end fittings 52 can be preassembled or assembled with a combination or socket wrench as the flotation array is assembled. In any event, the successive support bars 42, each have a compliance end fitting 52 at one end. The end fittings 52, 53 and bars 42 are threaded endwise into one another to extend in three orthogonal planes through the flotation module array. The endmost threaded ends at the surface of the array can be terminated with a spacer or an end fitting that is non-compressible, such as a washer and nut or the like, and may receive a tether or hook or lifting appliance part 39. At internal connections, a noncompressible spacer 53, inset in a bore in one of two abutting modules 21 can rest against an axially compressible element 52 that is joined to the rod 42 through the adjacent module 21, the compressible part 55 being likewise inset in a bore in the adjacent module.

After assembly, the interconnect coupling assemblies (compliance end fittings 52 and non-compressible terminating or spacing fittings 53) are disposed between each abutting pair of flotation elements that comprise the buoyant material. At low water pressure, the compliance end fittings bear against the buoyant material according to the spring constant of an axial compression spring 55. The axial springs bear between adjacent coupled flotation modules 21 at low water pressure. At higher water pressure, the buoyant material shrinks, whereupon expansion of the axial springs at each junction can expand and make up the difference to maintain supporting pressure between the compliance end fittings and the flotation modules.

Functional end fittings such as fittings having hooks, U-bolts, pulleys, hasps, fixture mounts and other useful arrangements can be selected for attachment to the compliance end fittings 52, spacers 53 or the threaded ends of bars 42, especially at the outer surfaces of flotation module array of plural modules 21. The associated flotation module or array of modules structurally coupled to one another by the rods and compliance end fittings are thereby attachable to a tool package, portable unit or subsea equipment, such as a further interconnect coupling for an abutting module or to a tether hook of further fitting to further elongate the coupled structures to which the buoyant material contributes upthrust.

The modules are preferably supplied in a kit containing modules of different sizes or shapes and modules configured for different depth ratings. The depth rating for each respective module is identified by labeling or by a distinctive appearance, such as by a particular color coded polyurethane shell.

Figure 8:
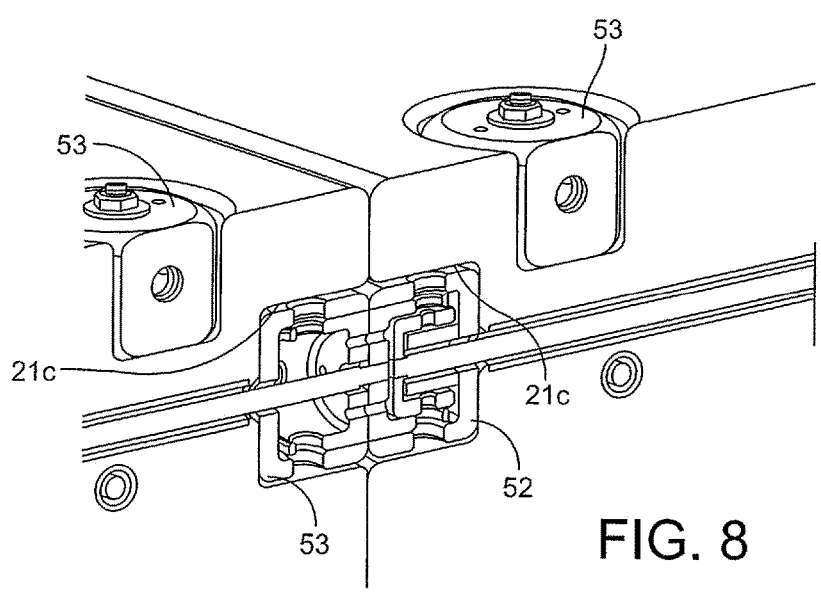
FIG. 8 is a cut away section showing abutment of two attached modules, the top side being an outer surface of the depicted array.

Flotation modules can be joined using purpose designed interconnecting hardware in both serial and parallel arrangements to provide the correct volume and configuration of buoyancy necessary for each mission configuration. According to one embodiment, for example as shown in FIG. 8, the flotation modules can be equally sized and provided with sets of interconnect coupling assemblies that align with those of other modules and have complementary genders. Adapter plates (FIGS. 1 and 2) can be disposed between modules that do not directly attach to one another, for example when it is desired to about modules at faces that are not of complementary gender, or to couple different sized modules. FIGS. 1 and 2 illustrate larger and smaller modules and modules with gender specific male and female mating sides, each coupleable to an adapter plate 23. These arrangements including versatile module placement in a building block manner together with the ability to use various size modules and modules of different character (such a modules with a function besides or alternative to buoyancy) provide precise control of total buoyancy, buoyancy distribution and physical attachment and mounting.

Syntactic flotation technology is advantageously employed to optimize the density and compressibility of the flotation modules, for example in steps of 1000 or 5000 meters of seawater, to full ocean depth rated modules. The Pacific Ocean has areas plumbed to over 35,000 feet. The modules are color coded to identify depth ratings.

However missions are typically carried out in a limited range of depths, and in another embodiment, a full complement of modules may be supplied with the same operational rating. According to another arrangement the modules are supplied in a few depth ratings such as three ratings of 2000, 3000 and 4000 meters sea water (msw).

The invention can be applied to flotation materials generally. However syntactic flotation materials are advantageous, namely with small flotation bodies distributed in a carrier medium, because the flotation elements that provide buoyancy are relatively incompressible and the compression of the modules at depth is well defined by the compression of the carrier material. Advantageously, the modules have an outer shell, surface treatment or discrete enclosure that provides protection and resistance to water intrusion during blunt impact due or abrasion from rough handling.

Figure 4:
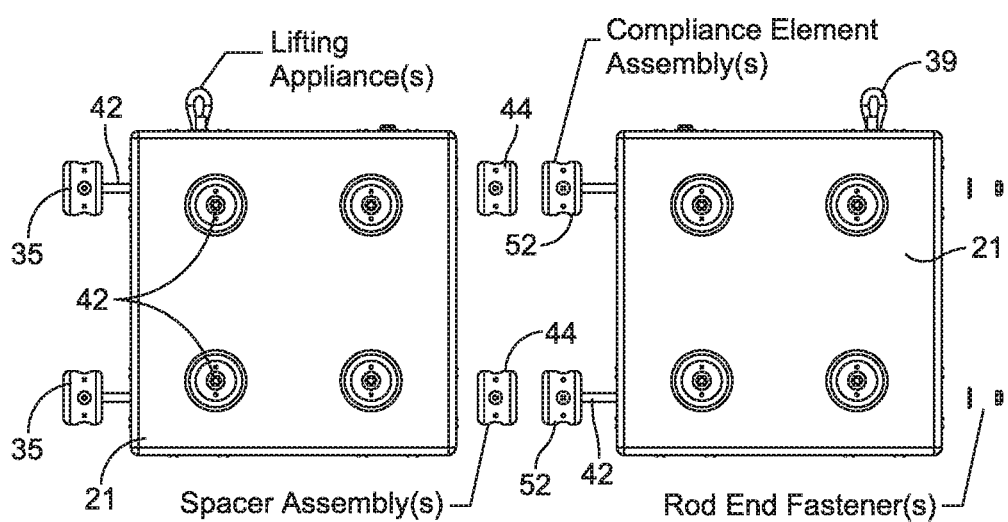
FIG. 4 is an elevation view showing assembly of modules according to one embodiments with compliance assemblies and spacers of complementary genders terminating the elongated support elements.

In the embodiment shown in FIG. 3, the module connection points at all sides are at counter bores in the flotation modules, and through bores extend through the modules. Module to module alignment and structural connection are accomplished using endwise affixable supporting bars 42 that extend through the through bores. The supporting bars each have an axially compressible compliance element 52 affixed at one end (e.g., a threaded end of the bar can be threaded into one side of an axially compressible compliance element). The opposite ends of the supporting bars are each threaded into the end of the compliance element on the next adjacent supporting bar 42 in line.

In the embodiments shown, the compliance elements 52 and abutting spacers 53 reside in counterbores such that elements 52, 53 are flush with the surfaces of their associated modules 21. At the outer surfaces of the array, a compliance element or simply a spacer of the same size as a compliance element can be threaded onto the end of the terminating bar 42 and located in a counterbore so as to extend flush with the outer surface. Preferably, one or more bars 42 emerge on each abuttable module face. In the illustrated example, four alignment compliance elements 52 emerge on each face of the module at four corners spaced inward from the module outer corners. The modules can be structurally joined using ¾ inch nominal clearance thru holes for interconnecting rods that pass through the body of the modules parallel to and spaced inwardly from the edges of module. The rods operate in tension due to the axial compressibility of the compliance elements. Therefore, it is possible in an alternative embodiment to provide flexural elements such as lengths of cable to function as ligaments, instead of rigid bars. Rigid bars are advantageous for lending more rigidity to the array of flotation modules.

The combination of axially compressible compliance element, and rods or ligaments extending between the compliance elements, allow for a simple yet effective method of assembly while compensating the volumetric changes associated with the bulk modulus of the flotation material at depth. The axial rods or ligaments can be flexural or rigid, and are tensioned by the compliance elements interposed between the rods or ligaments, leading out to the terminal ends of connected lines of rods/ligaments and compliance elements at which further structures such as hooks and tethers to other elements can be mounted.

Figure 9:
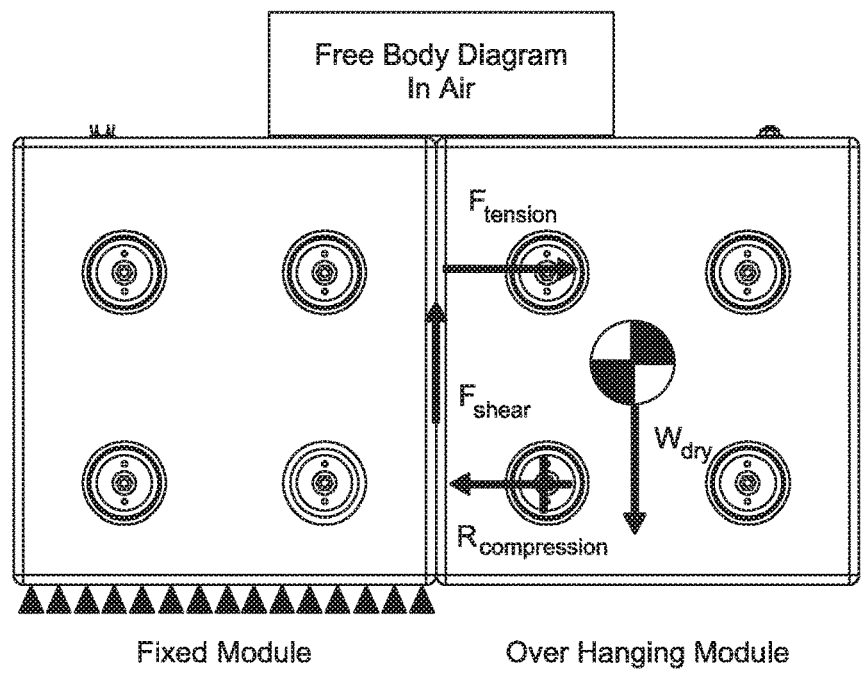
FIGS. 9 and 10 respectively show stresses on attached modules in an array, one being supported, when affected by gravity in air (FIG. 9) or by buoyancy in water.
Figure 10:
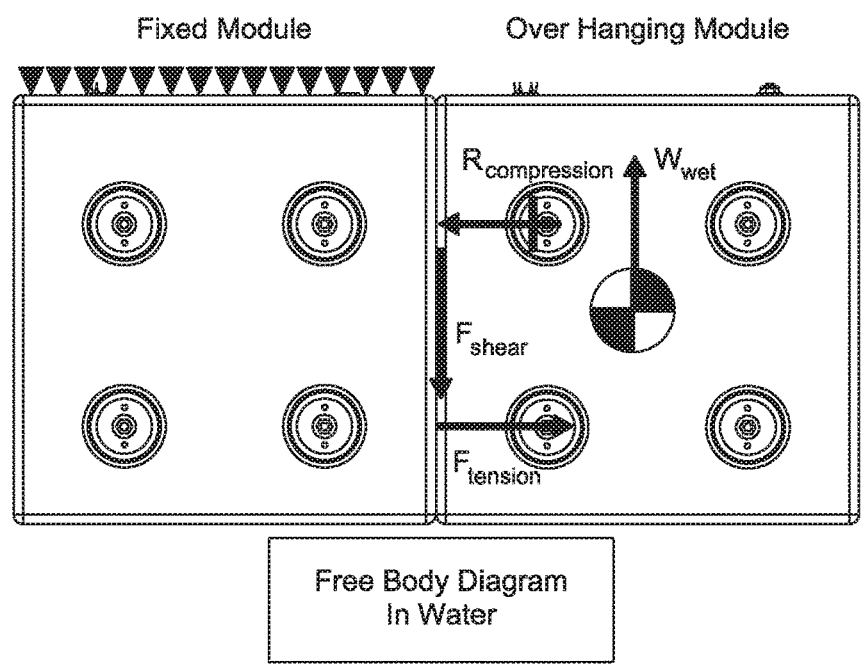

To achieve desired strength, faces of the blocks are preferably disposed in parallel planes for abutment. Alternatively, special brackets or other structural components could be introduced into the configuration. In the embodiment shown, four attachment points mate to four attachment points on an abutting parallel block. Having four attachment points on one block mate with two attachment points on each of two stacked abutting is also possible. That is, the modules can be half offset in one plane or in two orthogonal planes, similar to a masonry stacking pattern (not specifically shown in the drawings). Preferably, attention is given to ensuring that any lifting and attachment stresses applied to the attachment points are properly distributed, i.e., coupled into the array of connected blocks. FIGS. 9 and 10 compare the directions of forces that typically apply to a module array supported out of the water and having a cantilevered portion subject to downward force of gravity (FIG. 9) versus a module array supported under water with an extending part subject to upward force from buoyancy (FIG. 10).

One advantageous aspect of the disclosed embodiments is that the interlocking restraints can provide compressive compliance and preload between the syntactic foam flotation units. Even syntactic materials shrink somewhat under water pressure at depth. Preloading the compliance elements takes up some slack between the blocks so they don't become loose. If the blocks shrink slightly under pressure relative to the rods or ligaments while the rods or ligament don't shrink to the same extent, instead preloading or pre-compressing the modules between the compliance elements, the flotation module blocks remain substantially in abutment after shrinking and are not inclined to shift around on the rods. Likewise, as the flotation modules are brought to the surface and recovered, the preloading resumes and compresses the modules again. In this way, shrinkage and expansion are accommodated without extreme loss of structural integrity of an array when modules shrink due to compression and without interference damage and binding as the modules expand again when decompressed. The effect is achieved by pre-loading the tension on the rods or ligaments between the compliance elements by an amount that accounts for at least part of the shrinkage of the syntactic material of the flotation elements during compression to nominal deployment depth, optionally accounts for all of the expected shrinkage, and may accommodate, for example 75 to 90% of the shrinkage expected.

FIGS. 4 and 5a-5b show details of an embodiment of the tension rods or ligaments and end mounted compliance elements. FIG. 4 is partly exploded in that the end mounted elements that interlock the in-line pre-tensioning rods of abutting module blocks are seen exposed between the blocks. FIG. 5a shows in cross section a compliance element 52 and spacer 53, with two rods 42 threaded endwise into the compliance element 52 (one rod 42 passing through the passive spacer 53). At least the compliance element 52 is axially compressible against spring force of compressible spring element 55. FIG. 5b is an exploded view showing the axially compressible compliance element 52 with one rod 42. Each flotation unit as shown can have end mounted tension elements in counterbores 21c. In one embodiment, one end of each rod 42 has a fixed compliance element and the other end has a compliance element 52 that can be adjusted to shorten or lengthen the distance between opposite compliance elements, for example threading the compliance element 52 on the threaded end of a rod 42. The compliance element assembly 52 is adjustably sized between the compliance elements to compensate in length for the compressive displacement of the syntactic foam under hydrostatic pressure, namely to exert oppositely inward tension on the end mounted elements to account for part of the expected shrinkage.

With further reference to FIG. 5a, the starboard rod and the port rod can be separate, but preferably, the compliance unit is provided as a unit, e.g., with a 23⅞ inch long 12/nom stainless steel rod 42 permanently threaded into the compliance cup 52. The spring 55 can comprise a resiliently compressible cylinder of solid urethane.

As shown in FIG. 5a, there is an active (axially compressible) compliance assembly 52 disposed in a counterbore 21c in the starboard module and fixedly coupled to the starboard rod 42, and a passive spacer assembly 53 located in a counterbore 21c in the port module. On the port side, the rod 42 passes thru the passive spacer assembly 53 and threads into the floating stop 52c of the axially compressible element 52b on the compliance assembly 52. Thus the passive spacer assembly 53 is only an axial spacer that fills the counterbore 21c opening at the surface of the port flotation module 21.

The axially compressible spring 55 surrounds the starboard rod 42 and is enclosed in a movable spring cup 52b (open to starboard) and a floating stop 52c (a flanged hollow tube, open to starboard, with a threaded center bore). These are together enclosed in an outer retaining cup 52a (open to port). The spring cup 52b retracts within the mid body and compresses the urethane spring 55 to an extent that is a function of the axial tension applied to the starboard rod 42 when tightened to a predetermined stop.

The passive spacer assembly 53 can be similar in outer dimensions and complementary in structure except that the mid-body stop has a central through opening (not threaded) through which the adjoining port compliance assembly rod 42 extends to thread into the threaded center board of the fixed mid body 52c on the starboard side.

All of the spring cup 52b, floating stop 52c and retaining cup 52a have radial through holes for drainage and pressure relief when changing depth.

Figure 6:
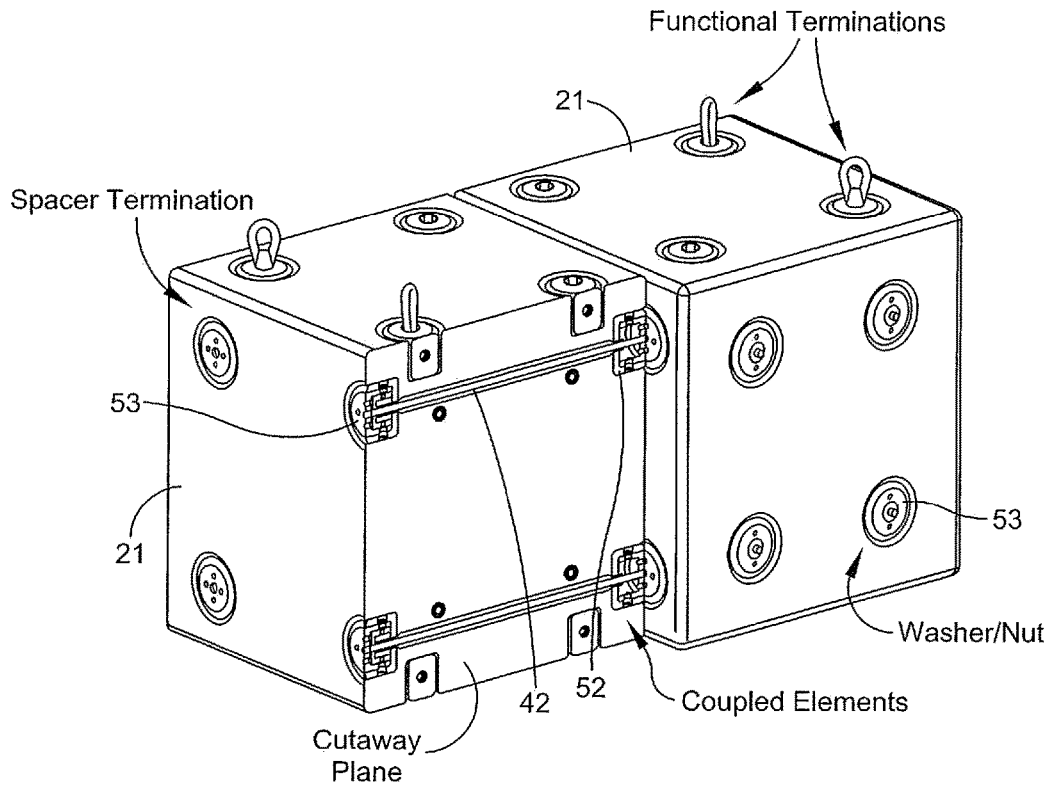
FIG. 6 is a partly cut away view in a plane of two elongated supports of two attached modules.

FIG. 6, illustrates an array of only two flotation modules 21 but exemplifies an array of any arbitrary number of connected modules 21. The left module is cut away in the plane of two of the eight rods or ligaments to reveal the connection of the threaded rods at coupled elements that where the two modules abut. Each of the two modules has two rods threaded to the coupled elements, only those of the left module being visible. The outer faces of the two modules, which are configured for the outermost surface of the array, have compliance end fittings that can be axially expandable elements 52 or simply rigid spacers 53. The end fittings on the outermost surface can have spacer terminations that thread onto the rods and may additionally have functional terminations such as hooks or eyes. Alternatively, the outer surface terminations are made with a washer and nut.

Figure 7:
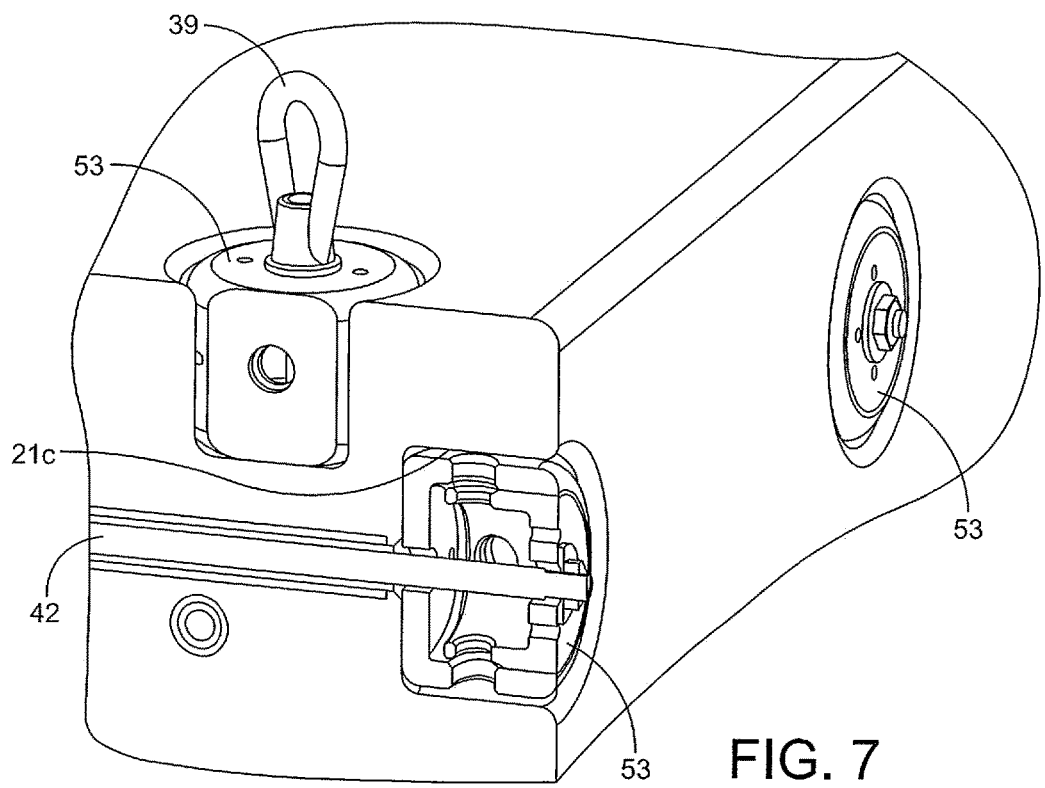
FIG. 7 is a partly cut away view in detail, the right side and top sides illustrating termination of an elongated structural support at an outer surface of an array, by and end bolt and a functional lifting point element, respectively.

FIG. 7 is an enlarged view showing these surface terminating fittings, showing the rod 42 passing through the spacer element 53. In FIG. 8, the coupled elements between the modules include an axially compressible compliance element 52 and a spacer element 53 that is not axially compressible. It can be seen that the rod 42 on the left side extends freely through the spacer element 53 with some clearance and threads into the compliance element 52. The compliance element 52 comprises two cup shaped telescoping elements 52a, 52b that open toward one another and capture the axial spring 55 between them, constituting a set of telescopically connected sleeves bearing inwardly on the spring 55. The rods 42 for the two adjacent modules thread into the two cup shaped telescoping elements 52b, 52c of the interspersed axially variable compliance element 52.

The axially compressed compliance element provides preload tension between the compliance ends on opposite faces of each flotation module. Sufficient macro strain is applied to compress the syntactic foam, approximating the extent of compression produced by hydrostatic pressure at depth. Advantageously, the tension applied between the compliance elements and maintained along the rod or ligament maintains sufficient compressive preload to reduce the extent to which any region on the outer surfaces of the flotation module go into tension due to buoyant forces. Any excess tensile stress generated in the material of the flotation module increases the risk of cracking or spalling of the substrate, for example of a settable polymer or epoxy.

An advantageous aspect of the exemplary embodiment is the provision of plural spaced compliance elements on tension rods or ligaments that eliminate tensile and shear loads on the syntactic flotation material, which may be brittle. The arrangement of the interconnecting assemblies results in the transfer of load via compressive forces against the bulk modulus of the material avoiding damaging tensile loads. Syntactic foam (like concrete) has essentially no tensile strength but has extremely high compressive strength. In the exemplary embodiment of a cube, four compliance elements are placed at the corners of a square that is centered and is approximately 50% of the size of the flotation block on a side.

To maintain a compression only load condition, the compliance elements 52 are configured to apply preload on the body of the flotation module, similar to the preload on a bolted flange. The geometry of the flotation blocks 21 strategically applies preloaded compressive forces. The magnitude of the preloaded compressive forces, normal to the surface of the body, are sized to exceed induced tensile loads on the interlocking ligaments/rods that carry the loads when forces on the array of coupled flotation elements would otherwise cause flexing of the array, due to weight if suspended in the air or buoyancy uplift forces in water. Pre-tensioning by pre-torqueing the compliance elements causes the modules to stay in place under abutting tension as the modules expand and contract, staying in place and transferring loads, while specifically avoiding point loads that could crack or shatter the flotation modules. Similar "pre-tensioned" concrete spans are used in bridges, buildings, etc.

FIGS. 9 and 10 demonstrate applicable forces modules coupled in an array when one module is fixed and a cantilevered second module is exposed to weight or uplift force. Naturally occurring shear loads are resisted by the normal Coulomb friction between module faces, which among other factors is a function of the pressure of abutment exerted by the rods/ligaments. That is, tension between the compliance elements compresses the associated flotation module and tension crossing over the junction between abutting flotation modules forces the abutting modules against one another in friction. The magnitude of the shear forces resisted by normal face to face compression forces are also a function of the surface finish or roughness and the durometer of the polyurethane outer shell material.

As seawater depth increases, the hydrostatic pressure increases. Hydrostatic pressure is equal in all directions and normal to the surfaces of the modules. The magnitude of hydrostatic pressure at the design depths are very high and can easily crush a compressible material. For example the hydrostatic pressure at 1000 meters of seawater is 1450 lbf/in$^2$ [10 bar] and 5800 lbf/in$^2$ [400 bar] at 4000 meters of seawater.

Syntactic flotation feels hard to the touch, but is designed to have a low bulk modulus, so the extreme hydrostatic pressures can be resisted without damage. Syntactic flotation material comprises a carrier material such as a settable plastic, populated with air filled glass micro-balloons disbursed throughout the matrix, preferably evenly and relatively densely. The carrier material can be epoxy plastic and can be relatively soft and compressible compared to the air filled balloons or beads. The micro-balloons and the low density air space they enclose displaces the sea water and provides buoyancy. The glass micro-balloons can be precisely spherical. Although other shapes are possible, a spherical shape gives the micro-balloons natural resistance to inward hydrostatic pressure. The wall thickness of the glass also contributes strength.

The epoxy carrier matrix can be many time more compressible than the glass sphere micro-balloons. The syntactic flotation's compliance or relatively low Bulk Modulus is accommodated by the mechanism that ties the individual modules into a full operational assembly.

Figure 11:
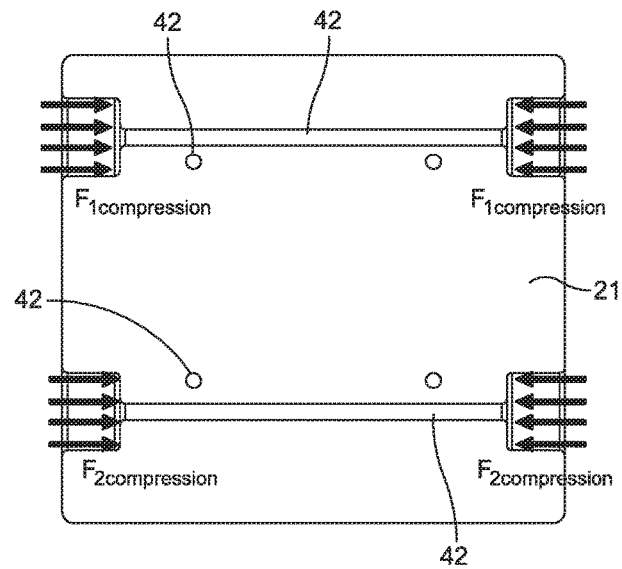
FIG. 11 shows compression forces applied endwise to elongated supports in a module.

As discussed above and shown in FIG. 11, the modules are preferably held tightly together under compression to effectively carry the buoyancy loads at depth. This compression or displacement of each flotation module is absorbed by the interconnecting tension members coupling between modules and by the interlocking compliance elements that inwardly compress each module individually. These interlocking compliance elements are configured to offset the syntactic flotation module shrinkage due to hydrostatic pressure so the modules do not shift at depth and the module faces stay aligned and in compression to avoid damage from shear or worsening tension of the material due to compression and decompression in continued use.

Figure 12:
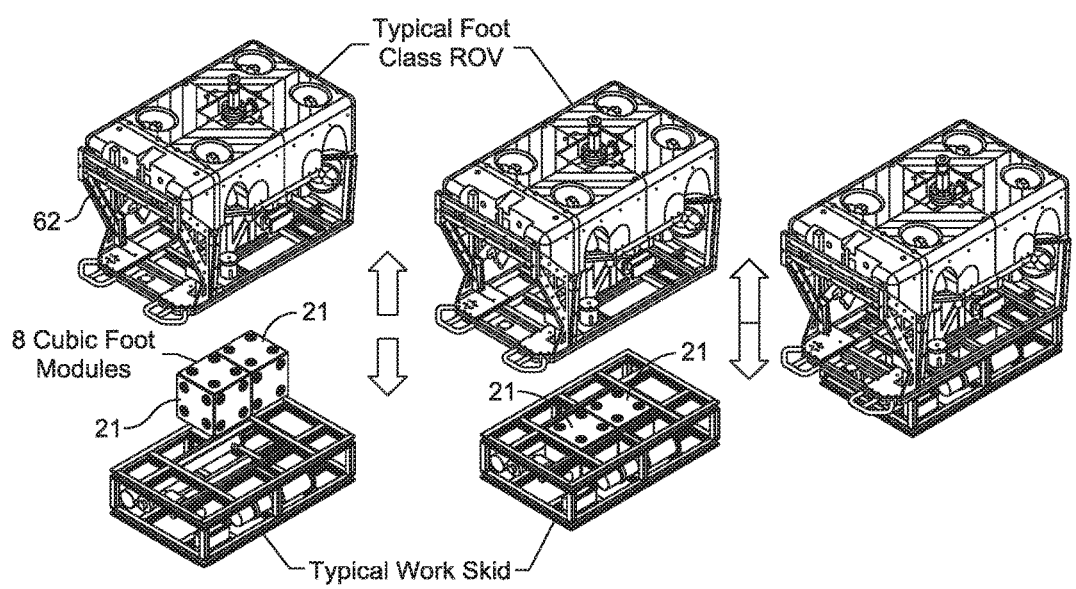
FIG. 12 is an assembly view showing steps for attaching an array of buoyancy elements to a work skid for a remotely operated vehicle (ROV).
Figure 13:
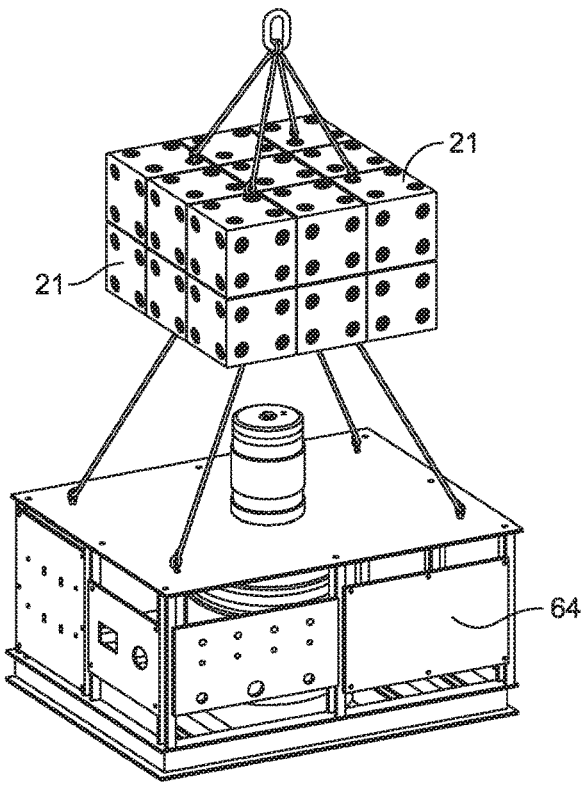
FIG. 13 is a perspective view of a payload that can be suspended from a cable support clevis, with an attached array of buoyancy modules.
Figure 14:
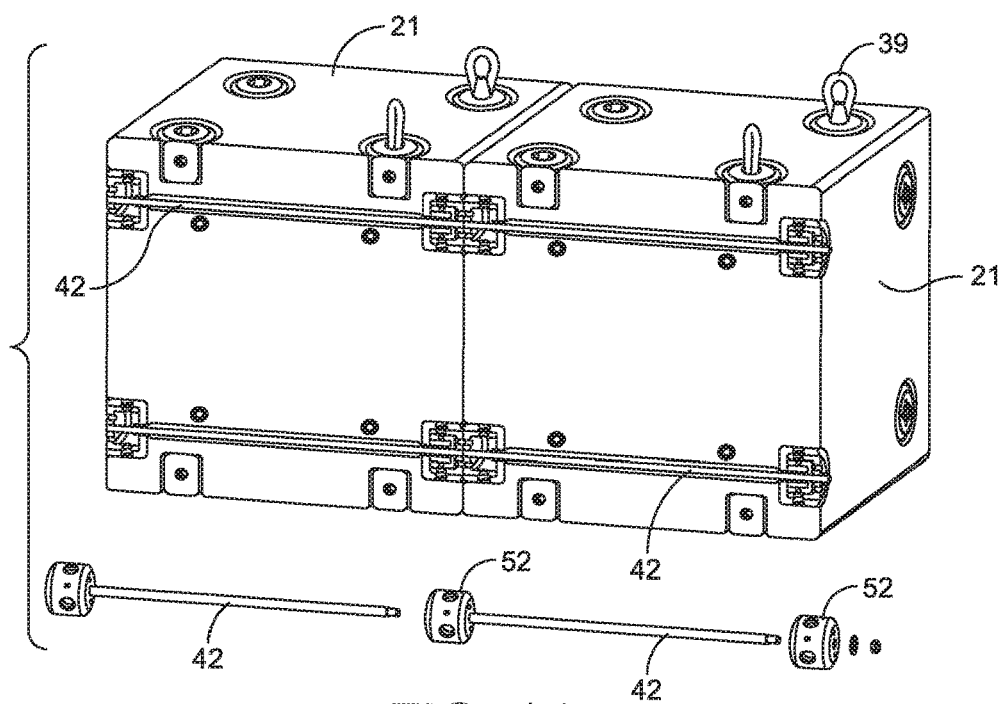
FIG. 14 is a further illustration of an array of two attached modules.

Subsea remotely operated vehicle (ROV) missions may typically involve the delivery of tooling, hardware or structures, or completion of a process such as mechanical operations using manipulators, spanners and graspers, positioning tooling and the like, often with X-Y-Z or radius-ascension-declination or similar supporting mechanisms articulated to, or mounted on, or engaged by the ROV. FIGS. 12-14 show some examples for manipulator vehicles 62 and loads 64. For some missions, the size of the equipment to be deployed or operated may be large compared to the ROV, in which case a work skid can be fashioned on which to mount and protect the equipment. Flotation elements may be attached to the work skid, advantageously to reach near neutral buoyancy so the ROV and work skid as an assembly can maneuver readily to accomplish the mission. An object of achieving near neutral buoyancy is that the operational forces from thrusters and other traversing mechanisms that move the vehicle and its tooling are devoted primarily to overcoming inertia, and not to overcoming the downward force of payload weight and/or upward force of payload buoyancy. FIG. 12 illustrates arrangements wherein work skids are provided with space for flotation modules as described.

Often, the equipment, the vehicle and the operations to be accomplished are quite different for successive missions. Rather than investing in custom modules for each mission, versatility to modify the amount and position of the supplemental flotation quickly is very valuable.

Another application for ROV intervention is enable terminal positioning, alignment and fit up to seafloor mounted equipment or structures. Versatile supplemental buoyancy is likewise useful for such missions, exemplified in FIG. 13, illustrating a lifting bridle arrangement with a heavy in-seawater unit that can be maneuvered by a work class Remotely Operated Vehicle. In this application the rigging on the lifting bridles includes ROV detachable shackles for use in attaching and removing a temporary flotation bundle.

If the system is near neutral buoyancy, at least within the extent of vertical lift or downward thrust and corner bollard pull of the Remotely Operated Vehicle, even a relatively massive load can be manipulated readily. The deployed unit can be located for deployment, released from the lift line and maneuvered into position and precisely placed, using the ROV and manipulators or other tools operable from the Remotely Operated Vehicle. It should be appreciated that insofar as payload weight may decrease during the mission by leaving behind installed equipment and the like, the extent of supplemental buoyancy needed to remain neutrally buoyant decreases. Provisions can be made to release one or more flotation elements to re-establish neutral buoyancy as needed, e.g., slidably affix elements to a line to the surface or otherwise attend to their recovery.

If the payload is heavier in sea water than the vertical lift capacity of a work class Remotely Operated Vehicle, it can be suspended from a ship on the surface by a lift line, at least during an initial phase during which supplemental flotation is attached. The addition of supplemental flotation increases the operating range and maneuverability of the Remotely Operated Vehicle and can greatly simplify many types of mission.

If the payload is wholly or substantially deployed (e.g., left in place on the sea floor), the flotation assembly that rendered the payload neutrally buoyant will produce up-thrust equal to the deployed payload weight. Where practical, the flotation assembly can be dissembled into smaller subsections or individual modules, of buoyancy manageable by the Remotely Operated Vehicle. The modules can be allowed to return to the surface or corralled in one way or another to keep the modules together for recovery. The modules can be brought to the surface using the ROV, in maneuverable small subsections that preferably have an up-thrust that is comparable to or slightly less than the vertical (downward) thrust capability of the specific Remotely Operated Vehicle. The subsections of one or more flotation modules can preferably are controlled within a water column so as not to rocket uncontrollably to the surface. The modularity of the invention provides flexibility in sizing these subsections for any Remotely Operated Vehicle of opportunity.

The rods and axially compressible compliance elements can be permanently affixed to one another as a unit, shown in FIG. 14. The flotation modules each have four through bores and counter bores, and can form an assembly kit capable of receiving any number of connected blocks. In FIG. 14, the kit also includes spacers that are not axially compressible, as described above, to be disposed at counter bores through which threaded free ends of the rods pass through freely to engage an axially compressible compliance element, and also to terminate a length of coupled rods and compliance elements that terminate with a threaded rod end In an alternative embodiment that resembles the gender attachments described with reference to FIGS. 2 and 3, counter bores may be provided only for the female faces of the modules and the opposed modules can have flush surfaces (no counter bores), thus eliminating the need for spacers at junctions between abutting blocks. However washer and nut terminations or functional terminations are needed on the outer surface of the array at termination that do not have counter bores.

The foregoing embodiments and variations are intended to exemplify the subject matter of the invention. The invention is not limited to the arrangements and embodiments presented as examples and is capable of similar variations within the scope of this disclosure.

The invention claimed is:

1. A buoyant apparatus for offsetting a load during immersion of the load in a fluid medium, comprising:
a plurality of buoyancy modules each including a material capable of floating in water and a set of one or more telescopically connected sleeves bearing inwardly on a spring, wherein the buoyancy modules are selectively attachable to one another, to form arrays that are of selectable size and shape;
wherein the buoyancy modules include elongated structural support elements extending between the buoyancy modules, the structural support elements being connected such that the buoyancy modules of the arrays are internally supported by a skeleton of said structural support elements when attached to one another, wherein the skeleton has one or more of the telescopically connected sleeves connected to respective one or more of said structural support elements, and the skeleton is extendable and compressible.

2. The buoyant apparatus of claim 1, wherein the elongated structural support elements are configured to connect to the telescopically connected sleeves of the buoyancy modules and are configured for affixation of the buoyancy modules to one another and to immersible apparatus via the fasteners.

3. The buoyant apparatus of claim 2, wherein the buoyancy modules include sets of buoyancy modules that differ from one another in at least one of size and polyhedral shape.

4. The buoyant apparatus of claim 2, wherein the material capable of floating in water is resiliently compressible and expandable as a function of water pressure, and wherein the skeleton is extendable and compressible by telescoping of the connected sleeves, for substantially maintaining abutment of the buoyancy modules as the material capable of floating in water becomes compressed and expanded by variation in hydrostatic pressure during immersion to a depth and by surfacing, respectively.

5. The buoyant apparatus of claim 4, wherein telescopically connected sleeves comprise compressible spring elements at least on one side of two of the structural support elements that connect between abutting ones of the buoyancy modules.

6. The buoyant apparatus of claim 5, wherein the material capable of floating in water-comprises foam.

7. The buoyant apparatus of claim 1, further comprising a set of said buoyancy modules that include members of a range of different sizes, shapes and compressibility, wherein the members are selectively connected in an array for a predetermined deployment, are recoverable after the deployment and thereafter selectively connected with other members and re-used repeatedly in a same array or in alternative arrays.

8. A method of using the buoyant apparatus of claim 1, including affixing the buoyancy modules to a remotely operated subsea vehicle for offsetting a weight of a payload and are controllably releasable at one of a predetermined depth and at deployment of the payload.

9. The buoyant apparatus of claim 1, wherein the compressible elements of the buoyancy modules are mounted in counter bores in the material capable of floating in water.

10. A method of using the buoyant apparatus of claim 1, comprising selectively attaching the buoyancy modules at outer surfaces of the array to one of a functional termination and a spacer.

11. A method for contributing buoyancy to support a payload during underwater deployment, comprising:
- providing an array of buoyancy modules each including a material capable of floating in water and a set of one or more telescopically connected sleeves bearing inwardly on a spring, wherein said buoyancy modules are selectively attachable to one another;
- wherein the material capable of floating in water is resiliently compressible under hydrostatic pressure;
- wherein the buoyancy modules include elongated structural support elements extending between the buoyancy modules, the structural support elements being connected such that the buoyancy modules of the arrays are internally supported by a skeleton of said structural support elements when attached to one another, wherein the skeleton has one or more of the telescopically connected sleeves connected to respective one or more of said structural support elements, and the skeleton is extendable and compressible;
- wherein the array of buoyancy modules comprise springs at least on one side of two of the structural support elements that connect between abutting ones of the buoyancy modules;
- selectively assembling the array in a size and shape that is adapted for the payload and for said deployment and is characterized by abutment of at least a subset of the buoyancy modules; and
- during deployment, compensating for compression of the material capable of floating in water by compression of the springs such that the buoyancy modules remain substantially in abutment.

12. The method of claim 11, further comprising attaching the array to one of the payload and an undersea structure to which the payload is attached; detaching the array after deployment of the payload; recovering at least part of the array at a water surface; and re-using the buoyancy modules in subsequent deployments.

13. The method of claim 12, wherein the undersea structure supporting the payload includes a remotely operated vehicle.

14. A buoyant apparatus for offsetting a load during immersion of the load in a fluid medium, comprising:
- a plurality of buoyancy modules each including a material capable of floating in water, wherein the buoyancy modules are selectively attachable to one another, to form arrays that are of selectable size and shape, each buoyancy module having a side having a bore;
- wherein the buoyancy modules include elongated structural support elements extending between the buoyancy modules, and a compressible spring element in a respective bore of at least one of the buoyancy modules, the structural support elements being connected such that the buoyancy modules of the arrays are internally supported by a skeleton of said structural support elements when attached to one another, wherein the skeleton is extendable and compressible by extension or compression of the compressible spring element.

* * * * *